United States Patent
Estival et al.

(10) Patent No.: US 10,395,509 B2
(45) Date of Patent: Aug. 27, 2019

(54) METHOD OF PREPARING AND/OR CARRYING OUT A GROUND SURVEY IN A REGION OF INTEREST AND RELATED APPARATUS

(71) Applicant: TOTAL SA, Courbevoie (FR)

(72) Inventors: Rémi Estival, Pau (FR); Henri Puntous, Pau (FR); Olivier De Pellegars, Pau (FR); Florent Bertini, Pau (FR); Paul Barbier, Pau (FR)

(73) Assignee: TOTAL SA, Courbevoie (FR)

( * ) Notice: Subject to any disclaimer, the term of this patent is extended or adjusted under 35 U.S.C. 154(b) by 0 days.

(21) Appl. No.: 16/001,079

(22) Filed: Jun. 6, 2018

(65) Prior Publication Data

US 2018/0357885 A1   Dec. 13, 2018

(30) Foreign Application Priority Data

Jun. 8, 2017  (EP) .................................... 17305688

(51) Int. Cl.
| | |
|---|---|
| *G08B 21/22* | (2006.01) |
| *G08B 23/00* | (2006.01) |
| *G08B 21/00* | (2006.01) |
| *G08B 13/196* | (2006.01) |
| *G01V 1/16* | (2006.01) |

(52) U.S. Cl.
CPC .............. *G08B 21/22* (2013.01); *G08B 21/00* (2013.01); *G08B 23/00* (2013.01); *G01V 1/168* (2013.01); *G08B 13/1965* (2013.01)

(58) Field of Classification Search
CPC ........ G06K 9/00; G06K 9/00651; G06K 9/32; G06K 9/39; G06K 9/46; G06K 9/6289; G06G 17/30; G06F 17/30997; G08B 13/19641; G08B 13/19645; G08B 13/1965; G08B 13/19652; G08B 13/19663
See application file for complete search history.

(56) References Cited

U.S. PATENT DOCUMENTS

| | | | |
|---|---|---|---|
| 4,621,347 A | 11/1986 | Ostrander | |
| 9,747,901 B1 | 8/2017 | Gentry | |
| 2003/0126977 A1 | 7/2003 | Garcia | |
| 2006/0162941 A1* | 7/2006 | Sridharan | .............. A62C 3/025 169/53 |
| 2011/0227748 A1 | 9/2011 | Schaible et al. | |

(Continued)

FOREIGN PATENT DOCUMENTS

| | | |
|---|---|---|
| CA | 2780249 A1 | 12/2013 |
| CN | 105015767 A | 11/2015 |

(Continued)

*Primary Examiner* — Van T Trieu
(74) *Attorney, Agent, or Firm* — Troutman Sanders LLP

(57) ABSTRACT

The method comprises triggering at least an event of the preparation and/or of the carrying out of the ground survey in a predetermined area of the region of interest; flying at least a presence detector able to detect the presence of a human and/or of an animal and/or of civil facilities in the predetermined area of the region of interest; before triggering the event, detecting presence of a human and/or of an animal and/or of civil facilities in the predetermined area with the presence detector; controlling the triggering of the event based on the results of the detection of a human and/or of an animal and/or of civil facilities made with the presence detector.

17 Claims, 5 Drawing Sheets

(56) References Cited

U.S. PATENT DOCUMENTS

| | | | |
|---|---|---|---|
| 2013/0249218 A1 | 9/2013 | Vassilev et al. | |
| 2014/0078865 A1 | 3/2014 | Coste | |
| 2014/0336862 A1 | 11/2014 | Womble | |
| 2015/0248736 A1 | 9/2015 | Myslinski | |
| 2016/0180126 A1* | 6/2016 | Saleem | H04N 7/185 |
| | | | 348/144 |
| 2016/0320503 A1* | 11/2016 | Talaalout | G01V 1/166 |
| 2017/0001723 A1 | 1/2017 | Tanahashi | |
| 2017/0174343 A1 | 6/2017 | Erickson et al. | |
| 2017/0203841 A1 | 7/2017 | Myslinski | |
| 2018/0165504 A1* | 6/2018 | Kerzner | G08B 13/1965 |
| 2018/0224854 A1* | 8/2018 | Mullan | G05D 1/104 |
| 2018/0293898 A1* | 10/2018 | Redmann | G08G 5/0013 |

FOREIGN PATENT DOCUMENTS

| | | |
|---|---|---|
| CN | 106940210 A | 7/2017 |
| CN | 107252495 A | 10/2017 |
| DE | 102009036809 A1 | 2/2011 |
| DE | 102013108204 A1 | 2/2015 |
| JP | 2016189114 A | 11/2016 |
| JP | 2017114270 A | 6/2017 |
| KR | 101715209 B1 | 3/2017 |
| KR | 20170054808 A | 5/2017 |
| WO | 200417096 A2 | 2/2004 |
| WO | 2013144676 A1 | 10/2013 |
| WO | 2015127856 A1 | 9/2015 |
| WO | 2015154148 A1 | 10/2015 |
| WO | 2015162330 A1 | 10/2015 |
| WO | 2015188831 A1 | 12/2015 |
| WO | 2016139503 A1 | 9/2016 |
| WO | 2016159481 A1 | 10/2016 |
| WO | 201783282 A1 | 5/2017 |

\* cited by examiner

METHOD OF PREPARING AND/OR CARRYING OUT A GROUND SURVEY IN A REGION OF INTEREST AND RELATED APPARATUS

CROSS-REFERENCE TO RELATED APPLICATIONS

The present application claims priority from European Patent Application No. 17305688.8 filed on Jun. 8, 2017, the entire contents of which are hereby incorporated by reference.

FILED OF TECHNOLOGY

The present invention concerns a method of preparing and/or carrying out a ground survey in a region of interest, comprising:
triggering at least an event of the preparation and/or of the carrying out of the ground survey in a predetermined area of the region of interest.

BACKGROUND

The method in particular includes dropping a plurality of probes intended to partially penetrate into a ground in a predetermined dropping area, to carry out measurements in the ground and/or generating a geophysical stimulus, in particular a seismic signal in the ground with a plurality of sources, each located in a predetermined shooting area.

Each probe is in particular intended to form a receiver including seismic sensors to conduct a geophysical survey in a region of interest.

The region of interest is notably a region with a difficult access. The region in particular comprises a high density of vegetation, such as a forest, in particular a tropical forest. Also, the region may comprise rugged terrain such as hills (for example foothills), cliffs and/or mountains. Also, the region may comprise dangerous to access areas, such as areas with unexploded ordinances (UXO's).

The method can also be applied to any region of interest.

Geophysical measurements obtained during such a survey are critical in building a sub-surface earth image representative of the particular geology in the region of interest, in particular to determine the location of potential reservoirs of oil and gas.

Such a geophysical survey is for example conducted by placing an array of seismic sources on or into the ground in the region of interest and by deploying seismic sensors able to record reflections of seismic signals produced by the successive sources on the different layers of the earth.

The survey generally requires implanting the sources at various locations, and partially introducing receivers in the ground, for instance along several lines or random pattern, to create a dense array of receivers.

The quality of the image obtained after the survey is generally a function of the surface density of sources and/or of receivers. In particular, a significant number of receivers have to be put in place in the ground to obtain an image of good quality. This is in particular the case when a three-dimensional image is required.

Placing sources and sensors in a remote region of interest may be a tedious, dangerous and expensive process. In particular, when the region is barely accessible, such as in a tropical forest and/or in a region with uneven terrain and/or in a region with UXOs, the sources and the sensors must be carried at least partially by foot by teams of operators. In many cases, clearings must be opened in the forest to place on the ground the relevant equipment and operators. Trails must then be cleared in the forest to put in place the receivers.

These tasks create a strong environmental impact in the region of interest and significant health and safety risks for the operators.

The set-up of the receivers and/or the sources in the ground is an extensive process which sometimes requires drilling the ground, and in the case of the receivers, ensuring that the coupling between the receiver and the ground is adequate.

In order to partially overcome this problem, US2015/0053480 discloses a method in which probes are carried by a flying vehicle such as an unmanned aerial vehicle. The flying vehicle is flown above the location at which the probe should be implanted in a dropping area. Then, the probe is dropped from the flying vehicle and falls to the ground.

The acceleration reached by the probe when it impacts the ground provides sufficient energy to at least partially penetrate the ground and provide coupling with the soil for subsequent measurements.

Nevertheless, such a solution is not entirely satisfactory. Indeed, dropping the probes causes severe hazards to the humans and/or animals and/or civil facilities which circulate in the region of interest. If the probe falls on a human and/or an animal, it can cause at best, a severe injury and at worse, a lethal injury. The fall of a probe on civil facilities can also lead to serious material damages.

The same problem arises during the carrying out of the ground survey when sources are used to generate a seismic stimulus. The sources often comprise explosives. Human and/or animal should be prevented from entering the shooting area around the sources.

One solution to try to overcome this problem would be providing a fence around the region of interest to prevent intrusion of humans and/or animals. This solution requires extensive work and materials, especially around regions of large surface area. Moreover, it would require logging large volumes of vegetation to place the fence. This solution would also disturb natural fauna. Additionally, placing a fence around the region of interest is not entirely reliable, as holes may exist in the fence.

SUMMARY

One aim of the invention is to obtain a method which allows preparing and/or carrying out a ground survey in a region of interest, the method being very safe for the humans and/or animals present in the region of interest.

To this aim, the subject-matter of the invention is a method of the above-mentioned type, characterized by:
flying at least a presence detector able to detect the presence of a human and/or of an animal and/or of civil facilities in the predetermined area of the region of interest;
before triggering the event, detecting presence of a human and/or of an animal and/or of civil facilities in the predetermined area with the presence detector;
controlling the triggering of the event based on the results of the detection of a human and/or of an animal and/or of civil facilities made with the presence detector.

The method according to the invention may comprise one or more of the following features, taken solely or according to any potential technical combination:

the presence detector comprises an optical detector, in particular a low-light camera or an infrared camera, and/or a multispectral detector;

the presence detector comprises a sensor able to detect an ID tag of a human and/or animal located in the dropping area;

the triggering of the event is carried out at night;

the method comprises analyzing at least a signal produced by the presence detector with an analysis unit to generate at least an alert signal when the presence of a human and/or of an animal and/or of civil facilities is detected and/or to generate at least a clearance signal when no human and/or animal and/or civil facilities is detected, the analysis unit being able to transmit the alert signal and/or the clearance signal to a control unit triggering the event;

the alert signal is chosen among a human alert signal, an animal alert signal and/or an undefined alert signal;

the method comprises the generation of an optical or sound alarm in the predetermined area when the presence of a human and/or of an animal has been detected by the flying presence detector;

the method comprises flying an alarm generator able to generate the optical or sound alarm when the presence of a human and/or of an animal has been detected by the flying presence detector;

the preparation and/or the carrying out of the ground survey includes dropping a plurality of probes intended to partially penetrate into a ground in a predetermined dropping area, to carry out measurements in the ground, the method comprising the following steps:

flying at least a probe carrier flying vehicle above the dropping area on the ground, the probe carrier flying vehicle carrying probes and a launching unit, able to separate each probe from the probe carrier flying vehicle the triggering of the event comprises activating the launching unit to separate at least one of the probes from the probe carrier flying vehicle above the dropping area;

the method further comprising:

falling of the probe from the probe carrier flying vehicle in the ground of the dropping area;

at least partial penetration of the probe in the ground of the dropping area the probe carrier flying vehicle carries the presence detector;

the method comprises flying a safety clearance flying vehicle distinct from the or each probe carrier flying vehicle, the safety clearance flying vehicle carrying at least one supplementary flying presence detector able to detect the presence of a human and/or of an animal and/or of civil facilities in the dropping area, the safety clearance flying vehicle advantageously flying above the or each probe carrier flying vehicle;

the method comprising, before triggering the event, detecting presence of a human and/or of an animal and/or of civil facilities in the predetermined area with the supplementary flying presence detector, the controlling of the triggering of the event being also based on the results of the detection of a human and/or of an animal and/or of civil facilities made with the supplementary presence detector, in addition to the detection of a human and/or of an animal and/or of civil facilities made with the presence detector;

the method comprises simultaneously flying a plurality of probe carrier flying vehicles, each probe carrier flying vehicle carrying probes and a launching unit, able to separate each probe from the flying vehicle above the same dropping area on the ground, and flying the same safety clearance flying vehicle for all probe carrier flying vehicles located over the same dropping area;

the method comprises flying at least a first group of flying vehicles of the plurality of probe carrier flying vehicles above the dropping area, simultaneously flying at least one presence detector above the dropping area and dropping probes in the dropping area, simultaneously flying a second group of flying vehicles of the plurality of probe carrier flying vehicles to and from the dropping area and simultaneously landing at least a third group of flying vehicles of the plurality of probe carrier flying vehicles in a base to load probes on the probe carrier flying vehicles of the third group;

each probe carrier flying vehicle has a collision detector and an autonomous redirection module able to modify the trajectory of the probe carrier flying vehicle when a potential collision with another probe carrier flying vehicle is detected;

the probe carrier flying vehicle and/or the safety clearance flying vehicle are unmanned aerial vehicles;

the preparation and/or carrying out of the ground survey includes generating a geophysical stimulus, in particular a seismic signal in the ground with a source located in a predetermined shooting area, the triggering of the event including activating the source to generate the geophysical stimulus;

the probes collect geophysical data arising from the seismic signal generated by the sources.

the triggering of the event is also controlled based on data received from at least one ground detector and/or from data received from at least one fixed aerial detector.

The invention further concerns an assembly for preparing and/or carrying out a ground survey in a region of interest, comprising:

a device for triggering at least an event of the preparation and/or of the carrying out of the ground survey in a predetermined area of the region of interest;

a flying vehicle carrying at least at least a presence detector able to detect the presence of a human and/or of an animal and/or of civil facilities in the predetermined area;

a control unit controlling the triggering of the event based on the results of the detection of a human and/or of an animal and/or of civil facilities made with the presence detector.

The assembly according to the invention may comprise one or more of the following features, taken solely or according to any technical feasible combination:

the preparation and/or of the carrying out of the ground survey includes dropping a plurality of probes intended to be partially introduced into a ground in a predetermined dropping area to carry out measurements in the ground, the device for triggering at least an event of the preparation and/or of the carrying out of the ground survey comprising at least a probe carrier flying vehicle carrying probes and a launching unit, able to separate each probe from the flying vehicle above a dropping area on the ground, the triggering of the event being the activation of the launching unit the assembly comprises a plurality of probe carrier flying vehicles, each carrying at least probes and a launching unit, able to separate each probe from the flying vehicle above the same dropping area on the ground, each probe carrier flying vehicle carrying a presence detector, the control unit controlling the activation of the launching unit of each probe carrier flying vehicle of the plurality of probe carrier flying vehicles based on the results of the detection of a human and/or of an animal and/or of civil facilities made with the presence detector;

the preparation and/or carrying out of the ground survey includes generating a geophysical stimulus, in particular a seismic signal in the ground, the device for triggering at least an event of the preparation and/or of the carrying out of the ground survey comprising at least a source located in a predetermined shooting area, the triggering of the event being the activation of the source to generate the geophysical stimulus.

the control unit is able to control the triggering of the event based on the results of the detection of a human and/or of an animal and/or of civil facilities made with at least one ground detector and/or with at least one fixed aerial detector.

BRIEF DESCRIPTION OF THE DRAWINGS

The invention will be better understood, based on the following description, given solely as an example, and made in reference to the following drawings, in which.

DETAILED DESCRIPTIONS

Figure 1:
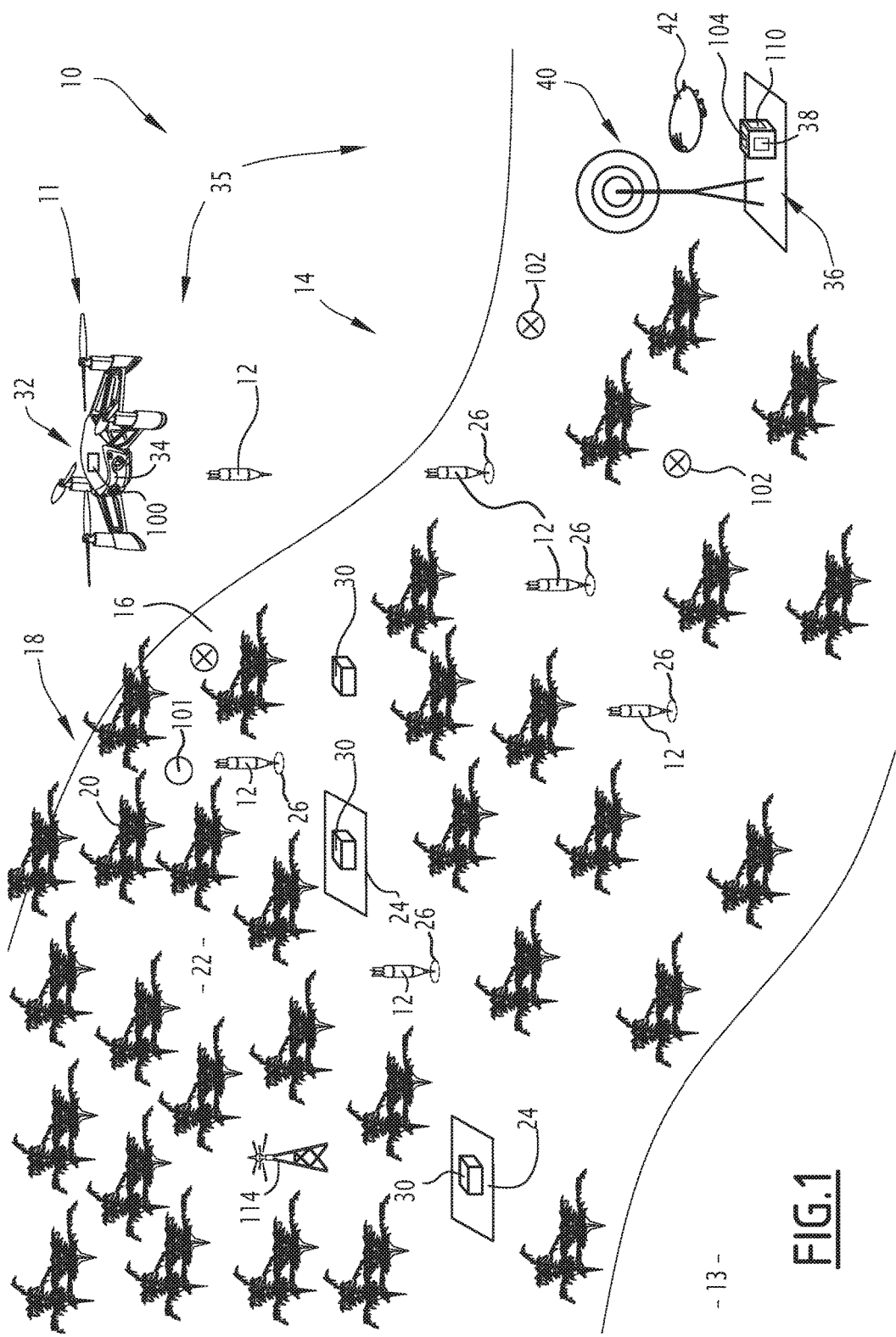
FIG. 1 is a schematic view of a region of interest comprising a ground survey assembly according to the invention.

A first ground survey assembly 10 comprising a plurality of probes 12 put in place by a dropping assembly 11 according to the invention is disclosed schematically in FIG. 1.

The ground survey assembly 10 is for carrying out a geophysical survey of an onshore region of interest 14 schematically shown in FIG. 1.

The assembly 10 is used in particular to collect geophysical data and measurements for determining the physical properties of the subsurface 13 located in the region of interest and/or for building an image of the geology of the subsurface 13, preferably a tridimensional image of the subsurface 13.

The region of interest 14 is for example a region having an uneven terrain 16. The uneven terrain 16 in particular comprises hills, mountains, cliffs or any type of rugged terrain. The region of interest 14 is for example located on foothills which are difficult to access.

The region of interest 14 further comprises vegetation 18. The vegetation 18 is for example a forest, in particular a tropical forest. It comprises a high density of vegetation, for example trees 20 forming a canopy 22 which covers a majority of the surface of the ground in the region of interest 14.

The subsurface 13 located below the ground comprises layers of geological formation and potentially oil and gas reservoirs.

In the region of interest 14, the vegetation 18 defines a plurality of natural and/or artificial clearings 24. The vegetation 18 in the region of interest 14 also defines sky holes 26 in the canopy 22.

The clearings 24 are spread in the region of interest 14, at a distance generally comprised between 100 m and 500 m, preferentially around 300 m, taken along the line of sight between two adjacent clearings 24.

The clearings 24 generally have a surface area greater than 25 $m^2$, at the ground level and generally greater than 900 $m^2$ at the top of the canopy 22. The seismic sources 30 can be put in place in the clearings 24.

A clearing 24 is for example defined in a OGP Standard "OGP-Helicopter Guideline for Land Seismic and Helirig operations—Report 420 version 1.1 Jun. 2013

Sky holes 26 are generally natural. They advantageously form a vertical "light tube" between the canopy 22 and the ground.

For example, the sky holes 26 have a minimal surface area greater than 1 $m^2$, preferentially greater than 3 m2, and comprised for example between 3 $m^2$ and 20 $m^2$.

The probes 12 are able to be dropped in each sky hole 26, as will be described later.

At least a sky hole 26 has a surface area which is smaller than the surface area of the clearings 24.

The ground survey assembly 10 comprises a plurality of sources 30, able to generate a geophysical stimulus in the ground, in particular a seismic signal. The ground survey assembly 10 further comprises a plurality of probes 12 spread in the region of interest 14 to collect geophysical data arising from the seismic signal generated by the sources 30.

In the example of FIG. 1, the ground survey assembly 10 further comprises the dropping assembly 11 for dropping the probes 12. The dropping assembly 11 includes a fleet of probe carrier flying vehicles 32, able to fly above the vegetation 18 to carry each probe 12 above its point of installation, and, for each probe carrier flying vehicle 32, a launching unit 34 able to separate each probe 12 carried by the flying vehicle 32 above the ground to let the probe 12 free fall to its installation point in the ground.

According to the invention, the dropping assembly 11 also comprises a safety clearance managing system 35 able to check whether the area below the flying vehicle 32 is free of human and/or animal activity and/or of civil facilities.

Civil facilities are for example camps, houses, bridges, vehicles, roads, airstrips, water reservoirs or dams.

The ground survey assembly 10 further comprises at least a base 36 (or secondary camp), comprising at least a collection and/or analysis unit 38 and a telecommunication system 40 able to transfer data measured by the probes 12 to the collection and/or analysis unit 38, and from the collection and/or analysis unit 38 to an external station (not shown).

The base 36 advantageously comprise a helipad, night facilities for crews, and/or antenna which collect data from small antenna located in the vicinity. It is used for management of the take-off and landing. It may be used for first aid (e.g. medevac).

The external station may be located at a main camp (not shown). The main camp advantageously comprises facilities for collecting data, as well as a main computing unit, and/or a control center.

Advantageously, the ground survey assembly 10 comprises at least an additional flying vehicle 42 (shown in FIG. 1) able to fly over the vegetation to carry the sources 30 in the clearings 24.

Each seismic source 30 is able to generate a controlled seismic energy generating a geophysical stimulus, in particular a seismic signal in the ground.

The source 30 for example comprises an explosive, in particular dynamite, able to generate the geophysical stimulus.

The source 30 is inserted in a hole drilled into the ground, for example at a depth comprised between 0 meter and 100 meters, preferably between 5 meters and 80 meters.

In a variant, the source 30 comprises a mechanical device such as a hammer, a vibrator . . . .

The density of sources 30 locations laid in the region of interest 14 is generally comprised between 10 source locations per $km^2$ and 100 source locations per $km^2$. Each source location can comprise one or more source 30.

Each source 30 is preferably arranged in a clearing 24. The source 30 is generally brought to the clearing 24 by the additional flying vehicle 42. It can be put in place by a unmanned ground vehicle, such as a semi automatic drilling platform.

Each probe 12 is partially introduced in the ground to sense in particular the seismic signals resulting from interactions of the seismic stimulus generated by a source 30 with the geology of the subsurface 13.

The density of probes 12 is comprised for example between 10 probes per $km^2$ and 1000 probes per $km^2$, in particular between 300 probes per $km^2$ and 500 probes per $km^2$, notably 400 probes per $km^2$.

Figure 2:
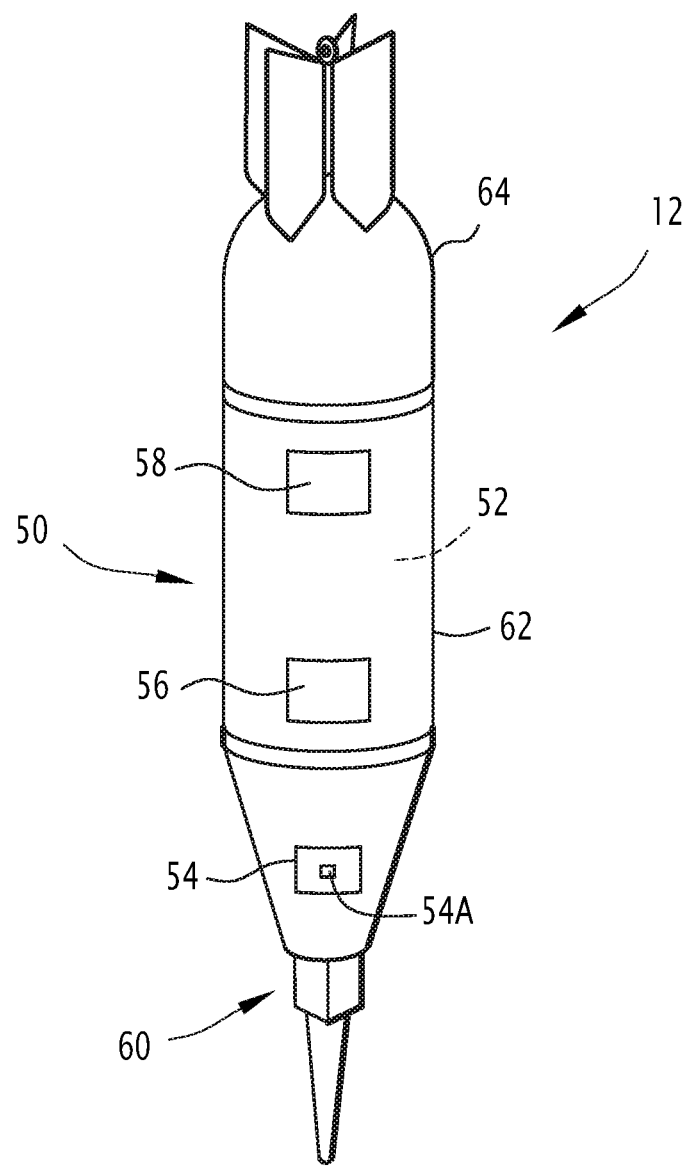
FIG. 2 is an external partial perspective view of a probe installed in the region of interest using the method according to the invention.

In the example shown in FIG. 2, each probe 12 has the shape of a dart. In a variant, the probe 12 has the shape of a ball and/or a parallel pipe shape.

The probe 12 comprises a hollow casing 50 defining a closed inner compartment 52, a sensor unit 54 comprising at least a sensor 54A received in the closed inner compartment 52 to sense at least a physical quantity, in particular a seismic signal.

The probe 12 further comprises an emitter 56 able to collect and send data representative of the physical quantity sensed by the sensor unit 54, and at least a power source 58 able to power the sensor unit 54 and/or the emitter 56. The emitter 56 and the power unit 58 are also received in the closed inner compartment 52 of the hollow casing 50.

In this example, the hollow casing 50 advantageously comprises a tapered lower end 60 to penetrate the ground, a central tubular partition 62, and a rear closing part 64 mounted at the rear of the central partition 62 opposite from the tapered lower end 60.

The sensor 54A comprises at least one geophone, in particular three geophones and/or an accelerometer.

The fleet of probe carrier flying vehicle 32 comprises a plurality of probe carrier flying vehicles 32, for example between 2 and 1000 probe carrier flying vehicles 32, preferably between 10 and 100 probe carrier flying vehicles 32.

Figure 3:
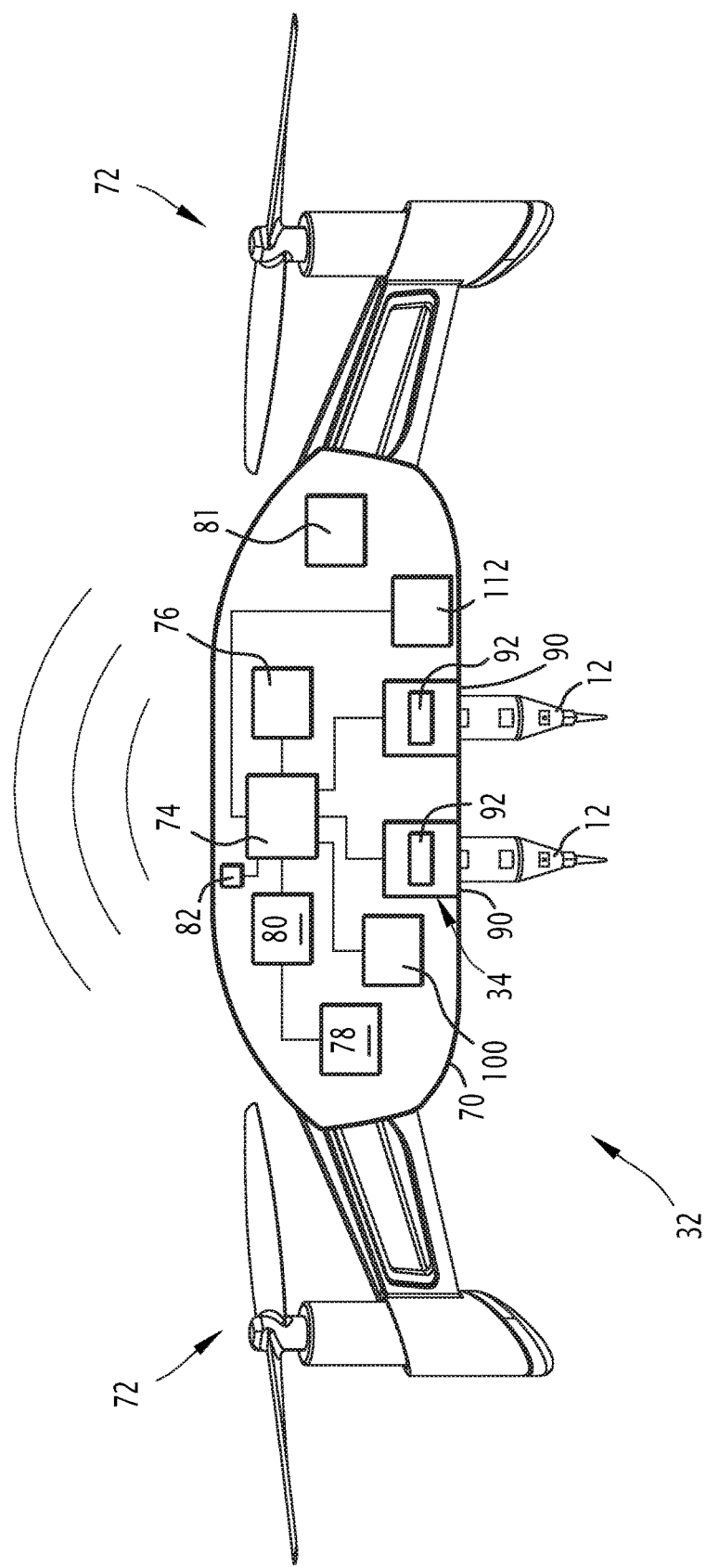
FIG. 3 is a schematic view of a probe carrier flying vehicle for dropping the probe of FIG. 2.

As shown in FIG. 3, each probe carrier flying vehicle 32 comprises a platform 70 carrying the launching unit 34 and the probes 12, and at least a propeller 72, in this example a plurality of propellers 72.

Each probe carrier flying vehicle 32 further comprises a central control unit 74 for driving the propellers 72 and directing the probe carrier flying vehicle 32 above the region of interest 14 to the dropping area in which each probe 12 has to be put in place.

The probe carrier flying vehicle 32 further comprises a communication unit 76 for receiving guidance data from the base 36 and for sending data to the base 36 through the telecommunication system 40.

The probe carrier flying vehicle 32 advantageously further comprises a collision detector 78, able to detect the potential occurrence of a collision with another flying unit and an autonomous redirection module 80, able to modify the trajectory of the probe carrier flying vehicle 32 when a potential collision with another flying vehicle is detected.

The probe carrier vehicle 32 further comprises a flight insertion unit 81, able to generate an identification signal visible to other flying vehicles in the area.

The central control unit 74 is able to receive data from the base 36 regarding the trajectory and/or the target position to be reached by the probe carrier flying vehicle 32. It is for example connected to a position detector 82 such as a ground positioning system.

The central control unit 74 is also able to activate the propellers 72 to fly the probe carrier flying vehicle 32 to the aimed target position along the desired trajectory.

The collision detector 78 for example comprises a radar. It is able to detect the presence of another flying vehicle in the vicinity of the probe carrier flying vehicle 32, and to detect the potential trajectory of the other flying vehicle. In a variant, the collision detector 18 is a sound detector, an ultrasound detector, a LIDAR, or a visual system.

In another variant, the collision detector 78 is a transponder.

The autonomous redirection module 80 is able to modify the trajectory of the probe carrier flying vehicle 32, to avoid collision with the flying vehicle detected by the collision detector 78. It is able to send a new trajectory to the central control unit 74 to implement the trajectory in case a potential collision is detected.

The autonomous redirection module 80 is for example able to modify the altitude and/or the direction of movement of the probe carrier flying vehicle 32 to avoid collision and then to redirect the probe carrier flying vehicle 32 towards its target.

The autonomous redirection module 80 is able to modify the trajectory according to predefined rules including priority rules for the vehicles on their way to a dropping area in comparison with vehicles being back from a dropping area.

The launching unit 34 comprises at least a retainer 90 able to hold at least a probe 12 in the platform 70, and at least a release mechanism 92 able to release the retainer 90 to free the probe 12 from the retainer 90 and let it fall down to the dropping area.

A volume located below the retainer 90 is advantageously open to let the probe 12 free fall from the platform 70. The release mechanism 92 is connected to the central control unit 74 for its actuation. It is able to release the retainer 90, without providing thrust to the probe 12.

In a variant, the probe 12 can be launched toward the ground. The launching impulse can be obtained by the integration of a thruster (ex: pyrotechnic, turbine, propeller . . . ) in the probe 12, or by the use of a propulsion mechanism onboard the probe carrier flying vehicle 32 (e.g. launching actuator or the decompression of a spring). The impulse accelerates the fall of the probe 12 to help it penetrate further into the canopy 22 and/or the ground.

In yet another variant, the fall of the probe 12 can be slowed down by a braking mechanism (e.g. a parachute attached to the rear closing part 64). Slowing down the fall of the probe 12 can for instance avoid damages to the probe.

In reference to FIG. 1, the safety clearance assembly 35 comprises at least a flying presence detector 100 (here carried on each probe carrier flying vehicle 32), the flying presence detector 100 being able to detect the presence of a human and/or an animal and/or of civil facilities in the dropping area. It further comprises additional detectors such as a fixed aerial detector 101 and/or ground detectors 102 (shown in FIG. 1), to detect the presence of a human and/or an animal in the dropping area, and more generally, in the region of interest 14.

The safety clearance assembly 35 further comprises a safety clearance control unit 104, here located in the base 36, to receive and analyze the data from each flying presence detector 100, from each ground detector 102, and/or from each fixed aerial detector 101. The safety clearance control unit 104 is able to control the activation of the launching unit 34 based on the results of the detection of a human and/or of an animal and/or of civil facilities made with each presence detector 100 and/or each ground detector 102 and/or from each fixed aerial detector 101.

Figure 5:
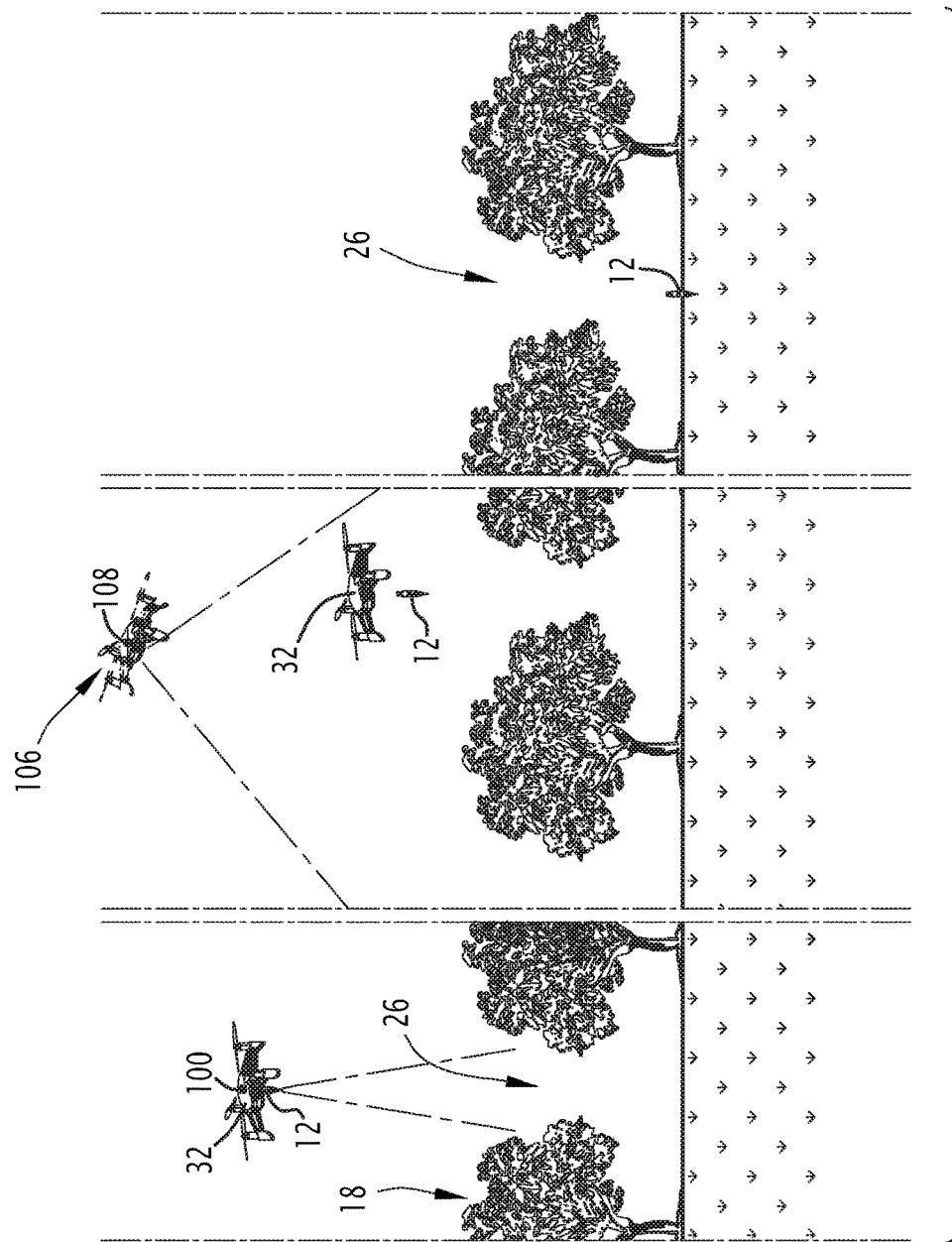
FIG. 5 is a schematic view of the method for installing the probes according to the invention.

In an advantageous variant, shown in FIG. 5, the safety clearance assembly 35 advantageously comprises a safety clearance flying vehicle 106 carrying a supplementary flying presence detector 108.

The safety clearance assembly 35 advantageously comprises an alarm generation module 110, able to trigger an sound alarm and/or a light alarm when the flying presence detector 100 and/or the ground detector 102 and/or the fixed aerial detector 101 has detected the presence of a human and/or of an animal and/or civil facilities in the dropping area. The alarm generated may warn the human and/or the animal in order to make it leave the dropping area.

The flying presence detector 100 is preferably carried by the probe carrier flying vehicle 32.

At least a flying presence detector 100 comprises an optical detector, in particular a low light camera, an infrared camera, or a multispectral detector, in particular a high definition visual camera, or an infrared camera. Its detection span is directed downwardly, towards the ground in the dropping area. In a variant the flying presence detector 100 is a LIDAR.

Advantageously, at least one flying presence detector 100 is able to detect an ID tag of a human and/or of an animal located in the dropping area. The detector 100 is for example a high definition camera or an infrared camera.

The ground detector 102 is for example a detector able to detect a movement, heat, a particular shape (i.e. classification on image) of a human and/or of animal entering the region of interest 14, or a region close to the dropping area. It also advantageously comprises detectors able to detect ID tags of a human and/or of an animal entering a region close to the dropping area. The ID tag is for example a RFID tag.

In a variant, the ground detector 102 comprises a distributing acoustic sensing (DAS) sensor and/or a distributing vibrating sensing (DVS) sensor based for example on optic fibers.

At least a ground detector 102 is for example located at a check point near the dropping area in the region of interest 14. The ground detector 102 can be set at particular point of interest to take advantage of the rough terrain like bridges, roads, mountain passes . . . .

In a variant, at least a ground detector 102 is located along a physical border of the region of interest 14 to monitor the entrance and exit of each individual human and/or animal in the dropping area inside the region of interest 14.

The fixed aerial detector 101 is for example a balloon equipped with a detector as defined above, in particular with at least a camera.

In the absence of detection of a human and/or of an animal and/or of civil facilities by each flying presence detector 100 or by each ground detector 102 and/or by each fixed aerial detector 101, the safety clearance control unit 104 is able to communicate with the control unit 74 of the probe carrier flying vehicle 32 to provide a clearance to the launching unit 34 for dropping a probe 12.

Advantageously, when the presence of a human and/or of an animal and/or of civil facilities has been detected by at least one flying presence detector 100 or by at least one ground detector 102 and/or by one fixed aerial detector 101, the safety clearance control unit 104 is able to communicate with the control unit 74 of the probe carrier flying vehicle 32 to provide a prevention signal, which prevents the activation of the launching unit 34.

The safety clearance control unit 104 is in particular able to gather all the information arising from each flying detector 100, from each ground detector 102 and from each fixed aerial detector 101. It comprises an analyzer able to generate a clearance signal in the absence of detection of presence of a human and/or of an animal and/or of civil facilities in the dropping area by all the detectors 100, 101, 102, or/and a prevention signal when any of the detectors 100, 101, 102 detects presence of a human and/or of an animal and/or of civil facilities in the dropping area.

The safety clearance control unit 104 is able to communicate with each probe carrier flying vehicle 32 to send the clearance signal or/and the prevention signal to the central control unit 74 through the telecommunication system 40 and the communication unit 76. The clearance signal or/and the prevention signal is sent to each probe carrier flying vehicle 32 before the activation of a launching unit 34.

Advantageously, the analyzer of the safety clearance control unit 104 is able to determine from the data received from the flying presence detector 100, from the ground detector 102 and/or from each fixed aerial detector 101 whether the detected presence is a human presence, an animal presence and/or an undefined presence, and to generate via the alarm generation module 110 a human alert signal, an animal alert signal and/or an undefined alert signal based on the detected presence.

The safety clearance additional flying vehicle 106 is able to fly above a plurality of probe carrier flying vehicles 32 to carry out a safety clearance operation with the supplementary flying detector 108. It is also connected to the safety clearance control unit 104. It is able to scan the whole region of interest, and in particular the dropping area.

The supplementary flying presence detector 108 is an optical detector, in particular a low light camera, an infrared camera, or a multispectral detector, in particular a high definition visual camera, an infrared camera or a LIDAR. Its detection span is directed downwardly, towards the ground in the dropping area.

The alarm generation module 110 is able to generate an alarm, when one of the flying detectors 100 and/or of the ground detectors 102 and/or the fixed aerial detector 101 detects presence of a human and/or of an animal and/or of civil facilities in the dropping area.

It comprises a flying alarm generator 112 carried by the probe carrier flying vehicle 32 and/or one or more ground alarm generators 114 (see FIG. 1) located in the region of interest 14.

The flying alarm generators 112 are able to generate a directional sound and/or optical alarm, in particular a siren, and/or a light signal directed towards the ground, in particular in the dropping area.

The ground alarm generators 114 are located at various places in and around the region of interest 14. They are able to generate a sound and/or a light alarm upon reception of the detection of a human and/or of an animal and/or of civil facilities in the region of interest 14.

The telecommunication system 40 comprises antennas located in at least part of the clearings 24, and/or flying antennas. It is able to collect data received from the emitter 56 of each probe 12 and to convey it to the collection and analysis unit 38 at the base 34. It is also able to transfer data between the safety clearance control unit 104 at the base 36 and the communication unit 76 of each probe carrier flying vehicle 32.

The additional flying vehicle 42 is for example an helicopter, an airship, or a balloon, which is able to carry the sources 30 towards each clearing 24. Advantageously, the airship can be an hybrid airship, etc.

The installation and operation of the ground survey assembly 10 according to the invention will be now described.

Initially, a location of a plurality of sources 30 and the location of a plurality of probes 12 in the region of interest 14 are defined respectively into artificial or natural clearings 24 of the region of interest 14 and into sky holes 26 of the region of interest 14.

The sources 30 and the probes 12 are carried to the base 36. The sources 30 are then put in place in the clearings 24, advantageously by flying the additional flying vehicle 42 to each clearing 24 and by unloading each source 30 in a clearing 24.

Each source 30 is then installed in a hole drilled in the ground.

The installation of the probes 12 is advantageously carried out at night to facilitate the detection of human and/or animal and/or civil facilities.

Each probe carrier flying vehicle 32 is loaded with one or more probes 12 at the base 34.

The probe carrier flying vehicle 32 takes off and flies towards the dropping area. Upon arrival above the dropping area, just before each probe 12 is launched, the flying presence detector 100 is activated to monitor the presence of a human and/or an animal and/or of civil facilities located below the probe carrier flying vehicle 32 in the dropping area, as shown in FIG. 5.

Simultaneously, the ground detection devices 102 and the fixed aerial detector 101 are activated to detect intrusions of human and/or animals in the region of interest 14, and more precisely in the vicinity of the dropping area and/or in the dropping area.

The safety clearance control unit 104 gathers all the data received from the detectors 100, 101, 102 and generates a clearance signal, if no human and/or animal and/or civil facility has been detected in the dropping area by all the detectors 100, 101, 102.

The clearance signal is then transmitted to the central control unit 74 of the probe carrier flying vehicle 32 through the telecommunication system 40 and through communication unit 76.

The central control unit 74 then activates the release mechanism 92 to free the probe 12 from the retainer 90. The probe 12 falls down from the retainer 90 to the ground, and penetrates at least partially into the ground to establish coupling between the sensor unit 54 and the ground.

In a variant or in complement, the safety clearance control unit 104 generates a prevention signal if a human and/or animal and/or civil facility has been detected in the dropping area by any of the detectors 100, 101, 102.

The prevention signal is sent to the central control unit 74 of the probe carrier flying vehicle 32 through the telecommunication system 40 and through the communication unit 76.

The prevention signal is sent to the central control unit 74 of the probe carrier flying vehicle 32 to prevent activation of the launching unit 34.

In an advantageous variant, the control unit 104 analyzes the signal produced by the presence detectors 100, 101, 102 to detect if the presence detected is a human presence, an animal presence, or an undefined presence. It triggers an alert signal, respectively a human alert signal, an animal alert signal and/or an undefined alert signal.

When the presence of a human and/or of an animal and/or of civil facilities is detected on the ground, in a region in a vicinity of the dropping area, the alarm generation module 110 activates.

If the human and/or animal activity is detected away from the dropping area, a visual and/or sound signal is emitted from the ground alarm generators 114, to warn the human and/or animal that a danger may occur.

If a human and/or an animal is detected in the dropping area, the flying alarm generator 112 is triggered to develop a directional sound and/or light alarm which is directed to the ground, to deter the human and/or animal from remaining in the dropping area.

The above described operations are then repeated for dropping other probes 12 with the probe carrier flying vehicle 32.

When the probe carrier vehicle 32 has dropped all its probes 12, it is flown back to the base 36 where it is loaded again with new probes 12.

Advantageously, as shown in FIG. 5, a safety clearance flying vehicle 106 flies above the probe carrier flying vehicles 32 to carry out a supplementary detection with a supplementary flying human presence detector 108.

Figure 4:
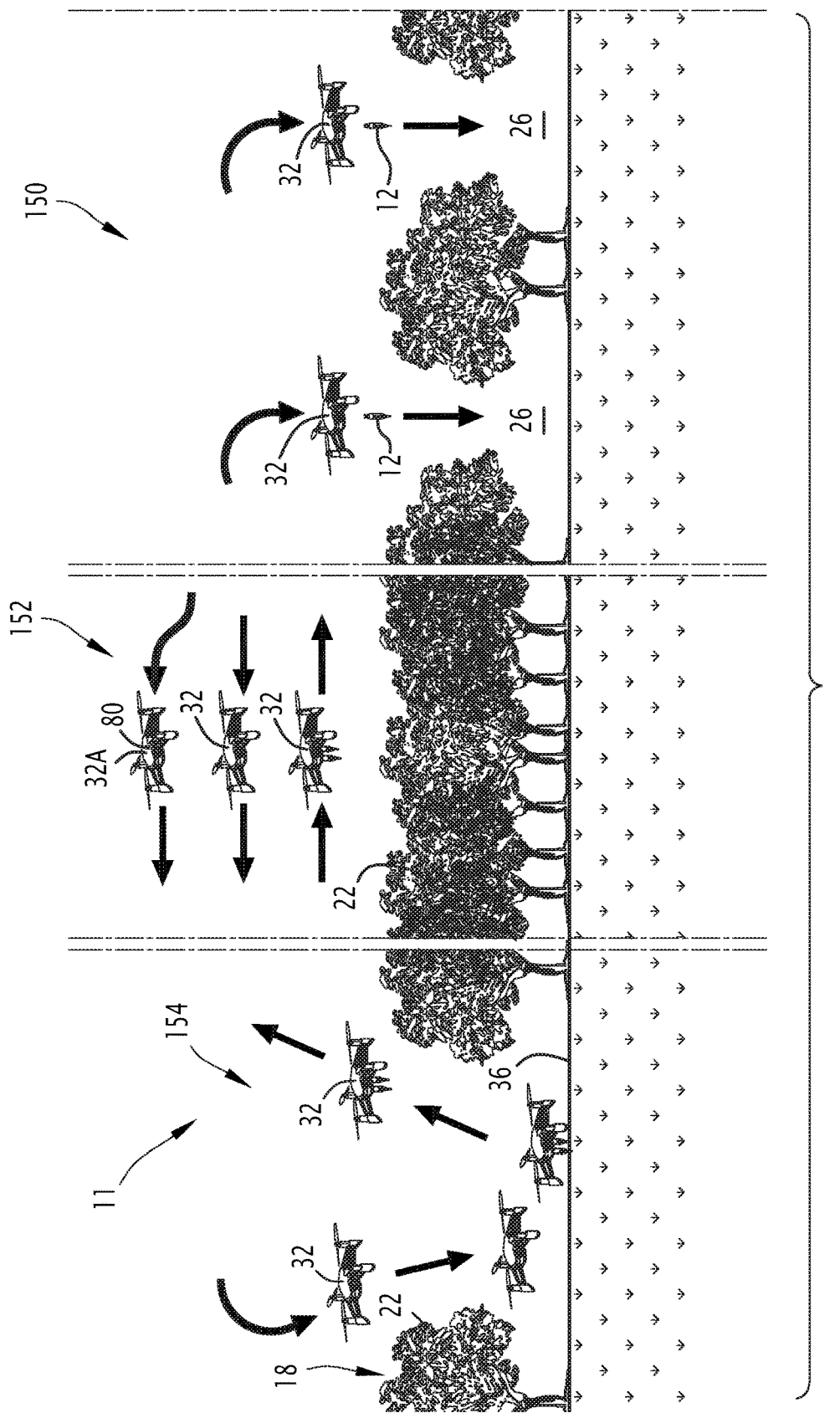
FIG. 4 is a side view of a fleet of probe carrier vehicles during the installation of the probes according to the invention.

Preferably, a fleet of probe carrier flying vehicles 32 is flown simultaneously to various dropping areas in the region of interest 14, as illustrated in FIG. 4.

A first group 150 of probe carrier flying vehicles 32 simultaneously fly over the dropping area to drop a plurality of probes 12 in the dropping area. Simultaneously, a second group 152 of flying vehicles fly to and from the dropping area and a third group 154 of flying vehicles 32 land at the base 36 to let probes be loaded in the probe carrier flying vehicles 32.

In that case, the central control unit 74 of each probe carrier vehicle 32 is given a target position and a desired trajectory by a control unit at the base 36.

The collision detector 78 and the autonomous redirection module 80 of each probe carrier flying vehicle 32 is activated to let each probe carrier flying vehicle 32 autonomously fly to the target position following the desired trajectory.

If another flying vehicle is detected by the probe carrier vehicle 32A collision detector 78 along the desired trajectory, the autonomous redirection module 80 redirects the probe carrier vehicle 32A to avoid a collision, for example by temporary changing its heading or altitude until the risk of collision is avoided.

Each probe carrier vehicle 32 of the fleet of probe carrier vehicles 32 therefore flies in a reduced aerial space above the dropping areas and to and from the dropping areas without a risk of collision, and without the need to precisely pilot each dropping probe carrier flying vehicle 32.

The carrying out of the ground survey then includes generating a plurality of geophysical stimuli, in particular seismic signals in the ground with at least a source 30 located in a predetermined shooting area.

The method according to the invention advantageously comprises flying at least a presence detector 100 able to detect the presence of a human and/or of an animal and/or of civil facilities in the predetermined shooting area before activating each source 30.

As described above, the presence detector 100 is carried on a flying vehicle 32, such as an unmanned aerial vehicle.

Before activating the source 30, the presence detector 100, along with each ground detector 102 and/or each fixed aerial detector 101 is activated to detect presence of a human and/or of an animal and/or of civil facilities in the predetermined shooting area.

The activation of the source 30 is controlled based on the results of the detection of a human and/or of an animal and/or of civil facilities made with the presence detector 100 and/or with the ground detector 102 and/or with the fixed aerial detector 101 as described above.

In the absence of detection of a human and/or of an animal and/or of civil facilities by each flying presence detector 100 or by each ground detector 102 and/or from each fixed aerial detector 101, the safety clearance control unit 104 is able to communicate with the control unit of the source 30 to provide a clearance for activating the source 30.

Advantageously, when the presence of a human and/or of an animal and/or of civil facilities has been detected by at least one flying presence detector 100 or by at least one ground detector 102 and/or by one fixed aerial detector 101, the safety clearance control unit 104 is able to communicate with the control unit of the source 30 to provide a prevention signal, which prevents the activation of the source 30.

In a variant, the safety clearance control unit 104 is located at the main camp.

Overall, the method according to the invention is extremely productive and safe. It significantly reduces the time to put in place the ground survey assembly 10 before it is ready for surveying. The installation of the probes 12 is easy to carry out, even for a large number of probes 12 and does not require an extensive amount of time to carry out the operation.

The use of a safety clearance assembly 35 comprising flying presence detectors 100 potentially in combination with ground presence detectors 102 and/or with fiwed aerial detectors is extremely efficient to detect on site the presence of human and/or animals and/or civil facilities in the region of interest 14 and more precisely, in the dropping areas or in the shooting areas. This greatly reduces and even eliminates any risk to the population and fauna located in the region of interest.

The method does not require setting up expensive fences or safety barriers, and is much more reliable than a physical fence.

As mentioned above, when a safety clearance flying vehicle 106 flies above the probe carrier flying vehicles 32 to carry out a supplementary detection with a supplementary flying human presence detector 108, the safety clearance control unit 104 is in addition able to gather the information arising from each the supplementary flying human presence detector 108 common to all probe carrier vehicles 32 in addition to the other collected information.

The analyzer is hence able to generate a clearance signal for each probe carrier vehicle 32, in the absence of detection of presence of a human and/or of an animal and/or of civil facilities in the dropping area by the detector 100 of the probe carrier vehicle 32 and also by the other detector 101, 102, 108 common to at least a group or/and probe carrier vehicles 32, and a prevention signal when any of the detectors 100, 101, 102, 108 detects presence of a human and/or of an animal and/or of civil facilities in the dropping area.

The invention claimed is:

1. A method of preparing and/or carrying out a ground survey in a region of interest, comprising:
   triggering at least an event of the preparation and/or of the carrying out of the ground survey in a predetermined area of the region of interest;
   flying at least a presence detector configured to detect the presence of a human and/or of an animal and/or of civil facilities in the predetermined area of the region of interest;
   before triggering the event, detecting presence of a human and/or of an animal and/or of civil facilities in the predetermined area with the presence detector;
   controlling the triggering of the event based on the results of the detection of a human and/or of an animal and/or of civil facilities made with the presence detector,
   wherein the preparation and/or carrying out of the ground survey includes generating a geophysical stimulus, in particular a seismic signal in the ground with a source located in a predetermined shooting area, the triggering of the event including activating the source to generate the geophysical stimulus, or
   wherein the preparation and/or the carrying out of the ground survey includes dropping a plurality of probes intended to partially penetrate into a ground in a predetermined dropping area, to carry out measurements in the around wherein the method comprises flying at least a probe carrier flying vehicle above the dropping area on the ground, the probe carrier flying vehicle carrying probes and a launcher, configured to separate each probe from the probe carrier flying vehicle, wherein the triggering of the event comprises activating the launcher to separate at least one of the probes from the probe carrier flying vehicle above the dropping area; wherein the method further comprising falling of the probe from the probe carrier flying vehicle in the ground of the dropping area, and at least partial penetration of the probe in the ground of the dropping area.

2. The method according to claim 1, wherein the presence detector comprises an optical detector, in particular a low-light camera, or an infrared camera, and/or a multispectral detector.

3. The method according to claim 1, wherein the presence detector comprises a sensor configured to detect an ID tag of a human and/or animal located in the dropping area.

4. The method according to claim 1, wherein the triggering of the event is carried out at night.

5. The method according to claim 1, comprising analyzing at least a signal produced by the presence detector with an analysis unit to generate at least an alert signal when the presence of a human and/or of an animal and/or of civil facilities is detected and/or to generate at least a clearance signal when no human and/or animal and/or civil facilities is detected, the analysis unit being configured to transmit the alert signal and/or the clearance signal to a control unit triggering the event.

6. The method according to claim 5, wherein the alert signal is chosen among a human alert signal, an animal alert signal and/or an undefined alert signal.

7. The method according to claim 1, comprising the generation of an optical or sound alarm in the predetermined area when the presence of a human and/or of an animal has been detected by the flying presence detector.

8. The method according to claim 7, comprising flying an alarm generator able to generate the optical or sound alarm when the presence of a human and/or of an animal has been detected by the flying presence detector.

9. The method according to claim 1, wherein the probe carrier flying vehicle carries the presence detector.

10. The method according to claim 1, comprising flying a safety clearance flying vehicle distinct from the or each probe carrier flying vehicle, the safety clearance flying vehicle carrying at least one supplementary flying presence detector configured to detect the presence of a human and/or of an animal and/or of civil facilities in the dropping area, the safety clearance flying vehicle advantageously flying above the or each probe carrier flying vehicle.

11. The method according to claim 10, comprising simultaneously flying a plurality of probe carrier flying vehicles, each probe carrier flying vehicle carrying probes and a launcher, configured to separate each probe from the flying vehicle above the same dropping area on the ground, and flying the same safety clearance flying vehicle for all probe carrier flying vehicles located over the same dropping area.

12. The method according to claim 1, comprising flying at least a first group of flying vehicles of the plurality of probe carrier flying vehicles above the dropping area, simultaneously flying at least one presence detector above the dropping area and dropping probes in the dropping area, simultaneously flying a second group of flying vehicles of the plurality of probe carrier flying vehicles to and from the dropping area and simultaneously landing at least a third group of flying vehicles of the plurality of probe carrier flying vehicles in a base to load probes on the probe carrier flying vehicles of the third group.

13. The method according to claim 12, wherein each probe carrier flying vehicle has a collision detector and an autonomous redirector configured to modify the trajectory of the probe carrier flying vehicle when a potential collision with another probe carrier flying vehicle is detected.

14. The method according to claim 1, wherein the probe carrier flying vehicle and/or the safety clearance flying vehicle are unmanned aerial vehicles.

15. Assembly for preparing and/or carrying out a ground survey in a region of interest, comprising:

a device for triggering at least an event of the preparation and/or of the carrying out of the ground survey in a predetermined area of the region of interest;

a flying vehicle carrying at least at least a presence detector able to detect the presence of a human and/or of an animal and/or of civil facilities in the predetermined area;

a control unit controlling the triggering of the event based on the results of the detection of a human and/or of an animal and/or of civil facilities made with the presence detector, wherein the preparation and/or carrying out of the ground survey includes generating a geophysical stimulus, in particular a seismic signal in the ground, the device for triggering at least an event of the preparation and/or of the carrying out of the ground survey comprising at least a source located in a predetermined shooting area, the triggering of the event being the activation of the source to generate the geophysical stimulus, or wherein the preparation and/or of the carrying out of the ground survey includes dropping a plurality of probes intended to be partially introduced into a ground in a predetermined dropping area to carry out measurements in the ground, the device for triggering at least an event of the preparation and/or of the carrying out of the ground survey comprising at least a probe carrier flying vehicle carrying probes and a launcher, able to separate each probe from the flying vehicle above a dropping area on the ground, the triggering of the event being the activation of the launcher.

16. Assembly according to claim 15, comprising a plurality of probe carrier flying vehicles, each carrying at least probes and a launcher, able to separate each probe from the flying vehicle above the same dropping area on the ground, each probe carrier flying vehicle carrying a presence detector, the control unit controlling the activation of the launcher of each probe carrier flying vehicle of the plurality of probe carrier flying vehicles based on the results of the detection of a human and/or of an animal and/or of civil facilities made with the presence detector.

17. Assembly according to claim 15, comprising flying a safety clearance flying vehicle distinct from the or each probe carrier flying vehicle, the safety clearance flying vehicle carrying at least one supplementary flying presence detector able to detect the presence of a human and/or of an animal and/or of civil facilities in the dropping area.

* * * * *